United States Patent
Sannino

(10) Patent No.: US 9,706,298 B2
(45) Date of Patent: Jul. 11, 2017

(54) METHOD AND APPARATUS FOR LOCALIZATION OF AN ACOUSTIC SOURCE AND ACOUSTIC BEAMFORMING

(71) Applicant: STMicroelectronics S.r.l., Agrate Brianza (IT)

(72) Inventor: Roberto Sannino, Romano di Lombardia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 533 days.

(21) Appl. No.: 14/150,455

(22) Filed: Jan. 8, 2014

(65) Prior Publication Data

US 2014/0192999 A1    Jul. 10, 2014

(30) Foreign Application Priority Data

Jan. 8, 2013    (IT) ............................... VI2013A0001

(51) Int. Cl.
*H04R 3/00*     (2006.01)
*G01S 3/808*    (2006.01)

(52) U.S. Cl.
CPC ............ *H04R 3/005* (2013.01); *G01S 3/8083* (2013.01)

(58) Field of Classification Search
CPC ............................... G01S 3/8083; H04R 3/005
USPC .... 381/91, 92, 111, 122; 367/118, 119, 121, 367/129; 700/94
See application file for complete search history.

(56) References Cited

U.S. PATENT DOCUMENTS

| 6,760,449 | B1* | 7/2004 | Matsuo | H04R 1/406 381/122 |
| 6,826,284 | B1* | 11/2004 | Benesty | G01S 5/22 348/14.08 |
| 7,471,798 | B2 | 12/2008 | Warren | |
| 2004/0252845 | A1* | 12/2004 | Tashev | G01S 3/8034 381/56 |
| 2005/0175190 | A1* | 8/2005 | Tashev | H04R 3/005 381/92 |

(Continued)

FOREIGN PATENT DOCUMENTS

WO    WO2008059476    5/2008

OTHER PUBLICATIONS

Italian Search Report for Italian Application No. VI20130001, Ministero dello Sviluppo Economico, Munich, Germany, Sep. 27, 2013, 2 pages.

(Continued)

*Primary Examiner* — Vivian Chin
*Assistant Examiner* — Friedrich W Fahnert
(74) *Attorney, Agent, or Firm* — Seed IP Law Group LLP

(57) ABSTRACT

Embodiments include a method and an apparatus for the localization of at least one source of an acoustic signal including: temporally sampling the acoustic signal with a plurality of microphones to obtain a (D+1)-dimensional space-time matrix representation of the acoustic signal, wherein D is the number of spatial dimensions, applying a (D+1)-dimensional Fourier transform to the matrix representation, determining a first peak in a spectrum obtained based on the application of the Fourier transform, and calculating the direction of arrival of the acoustic signal at at least one of the plurality of microphones based on the determined first peak.

13 Claims, 7 Drawing Sheets

(56) References Cited

U.S. PATENT DOCUMENTS

| | | | |
|---|---|---|---|
| 2007/0076899 A1* | 4/2007 | Hsu | H04R 3/005 381/92 |
| 2008/0247565 A1* | 10/2008 | Elko | H04R 3/005 381/92 |
| 2010/0054085 A1* | 3/2010 | Wolff | G01S 3/8083 367/125 |
| 2012/0140947 A1* | 6/2012 | Shin | H04R 3/005 381/92 |
| 2012/0214544 A1* | 8/2012 | Shivappa | H04M 1/72572 455/556.1 |

OTHER PUBLICATIONS

Jacek Dmochowski, Jacob Benesty, and Sofiene Affes, "On Spatial Aliasing in Microphone Arrays", IEEE Transactions on Signal Processing, vol. 57, No. 4, Apr. 2009, 13 pages.

\* cited by examiner

METHOD AND APPARATUS FOR LOCALIZATION OF AN ACOUSTIC SOURCE AND ACOUSTIC BEAMFORMING

PRIORITY CLAIM

The instant application claims priority to Italian Patent Application No. VI2013A000001, filed 8 Jan. 2013, which application is incorporated herein by reference in its entirety.

TECHNICAL FIELD

An embodiment relates to a method and an apparatus for localizing a source of an acoustic signal using an array of microphones to determine the direction of arrival of the acoustic signal at the array of microphones, and for allowing for subsequent separation of the acoustic signal emitted by the source from ambient noise via beamforming of the microphone array.

SUMMARY

Sound localization and sound separation, particularly via beamforming, are frequent problems in nowadays digital signal processing. A typical example is the "cocktail party problem", where a number of people are talking simultaneously in a room and the challenge is to try and follow one of the discussions.

Other examples are tele- or video-conferencing facilities, where the acoustic signal from a current speaker in the audience shall be singled out from the background noise, and hands-free equipment for telecommunication in vehicles like car, where the speech of the driver or a passenger shall be separated from the ambient noise and other speakers.

Several approaches have been proposed for the solution of this problem in the state of the art. Some of them employ a plurality of microphones arranged in a microphone array to localize the source of a specific acoustic signal. Acoustic signals can be voice signals, like speech or singing, but also sounds from musical instruments, music in general, cries of a baby, noise, or the like.

A microphone array is a set of microphones, generally coupled to a single processing unit. In an array of digital microphones, which output a digital audio stream rather than an analog signal, the digital signals are generally synchronized such that it is possible to associate each digital sample of the acoustic signal with a precise timestamp. Digital microphones generally (temporally) sample an acoustic signal with a predetermined sampling frequency $f_s$. The received acoustic signal, i.e., the pressure fluctuations due to a sound wave, are typically sampled and output in the form of electrical voltages or currents. The output $w_n(t)$ of the n-th microphone in an array, therefore, generally represents the pressure fluctuations of the acoustic signal received by the corresponding microphone at sampling time points t in a digital form.

Sound localization is the process of determining the location of a sound source with respect to the position of receiving microphone(s).

Many state-of-the-art sound-localization systems solve the problem by analyzing each temporal sampling signal $w_n(t)$ or its Fourier transform $W_n(f)$ where f is the frequency. The direction-of-arrival (DOA) angle $\theta$ of the acoustic signal is computed as a function of the delay between the signals. Such delay is typically computed by cross-correlation of the different microphone signals.

For example in the case of a two-microphone system, cross-correlation between signals from the two microphones will show a peak corresponding to the actual acoustic propagation delay between the two samples. Once such a delay $\tau$ is known, the DOA angle $\theta$ can be computed by solving the following equation for $\theta$:

$$\tau = \delta/c \sin \theta$$

where $\delta$ is the distance between microphones, c is the speed of sound, and $\theta$ is the angle between the connection line from the first microphone to the source of sound and the connection line between the two microphones.

Once the direction of arrival has been determined, the acoustic signal from the located sound source can be singled out from ambient sound sources, like other speakers, noise, etc., by a beamforming technique.

Alternatively, the direction $\theta$, in which to form a beam, may be determined by other means than by source localization, e.g., based on predetermined scanning angles for security/surveillance applications or on visual/optical source localization. For instance, one may want to point the acoustic beam in a certain direction in order to determine whether an acoustic event, like a voiced sound, occurs in that direction.

Beamforming is a signal-processing technique used to control the directionality of the reception of an acoustic signal on a microphone array and is usually achieved by a filtering step or a processing step on the Fourier transform $W_n(f)$. The array of omni-directional microphones behaves as a single directional microphone and the acoustic beam can be steered towards the speaker in order to maximize the reception in the direction of the speaker and to attenuate unwanted sounds coming from any other direction.

However, cross-correlation, filtering, and other techniques known in the art may be costly in terms of computational requirements and are often limited to an array of two microphones only. To improve the preciseness of the sound localization and the quality of the separated signal in terms of signal-to-noise (SNR) ratio, often arrays including more than two microphones are used. For an increasing number of microphones, though, the methods known in the art become exceedingly complex and computationally demanding. Also, implementation of the algorithm is generally complex in the art, therefore increasing production costs of a beamforming array.

With respect to tele- and video-conferences becoming more and more popular and involving more and more participants, frequent switching of the beam from one speaker to another may be required. State-of-the-art systems may produce a significant delay when switching the beam due to the complexity of the involved algorithm, and this delay may reduce the quality of the conferencing system.

A simple and highly effective method for sound localization and beamforming is therefore needed to improve the quality and flexibility of directional microphone arrays. Also, microphone arrays of higher dimensions (other than linear) are desirable.

The recent introduction into the market of MEMS (microelectromechanical systems) microphones enables low-cost deployment of a multi-microphone array. Due to the small size of MEMS microphones, an entire microphone array can be easily fitted into a hosting infrastructure (e.g., a television set, a table, a window, etc.) without a negative impact on the aesthetics of the hosting infrastructure.

An embodiment includes a method for localizing at least one source of an acoustic signal, the method including the consecutively performed steps in the recited order:

temporally sampling the acoustic signal with a plurality of microphones to obtain a (D+1)-dimensional space-time matrix representation of the acoustic signal, wherein D is the number of spatial dimensions;

applying a (D+1)-dimensional Fourier transform to the matrix representation;

determining a first peak in a spectrum obtained based on the application of the Fourier transform; and calculating the direction of arrival of the acoustic signal at at least one of the plurality of microphones based on the determined first peak.

The microphones may particularly be digital microphones that each receive a respective acoustic signal and output a respective digital signal. The respective acoustic signal received by each microphone is temporally sampled, i.e., reduced from a time-continuous signal to a time-discrete signal. The sampling rate $f_s$ for the temporal sampling may be predetermined and is typically chosen such that the Nyquist frequency of the sampling system is larger than the highest frequency which shall be sampled from the acoustic signal. The digital (sampled) signals that are output by the plurality of microphones may be synchronized in a sense that it is possible to identify each digital sample of the acoustic signal with a precise timestamp. Generally, all of the plurality of microphones will have the same sampling rate $f_s$, however, this is not a requirement for an embodiment as described below. In the case that all of the plurality of microphones have the same, or approximately the same, sampling rate $f_s$, the microphones may be synchronized in a sense that all of the plurality of microphones sample the acoustic signal at the same, or at approximately the same, time points $t_0$, $t_1$, $t_2$, etc.

The digital audio signals captured and output by the plurality of microphones can be collected into a (D+1)-dimensional space-time matrix representation, wherein D is the number of spatial dimensions. The number D of spatial dimensions may be 1 if all of the plurality of microphones are arranged along a straight line, it may be 2 if all of the plurality of microphones are arranged in one plane, and it may be 3 otherwise.

Here and in the following, a (D+1)-dimensional matrix representation denotes a representation of a discrete function on a regular, (D+1)-dimensional grid in the corresponding (D+1)-dimensional space, i.e., includes D+1 one-dimensional vectors representing the coordinates of the grid nodes in the corresponding dimension and constituting together the regular, (D+1)-dimensional grid and the elements of the (D+1)-dimensional matrix representation of the function. For the (D+1)-dimensional space-time matrix representation, D dimensions are spatial dimensions while one dimension is the time dimension.

In particular, Cartesian coordinates of the locations of each of the microphones in a freely defined three-dimensional Cartesian coordinate system may be defined by a single linear parametric equation with D parameters and the D spatial dimensions of the (D+1)-dimensional space-time matrix representation of the acoustic signal may be given by the D parameters of the linear parametric equation. The linear parametric equation may, for instance, be written in the form $x(\lambda_1, \lambda_2, \lambda_3) = x_0 + \lambda_1 k_1 + \lambda_2 k_2 + \lambda_3 k_3$ if D=3, wherein $x(\lambda_1, \lambda_2, \lambda_3)$ specifies the locations of the plurality of microphones as a three-dimensional vector and $x_0$ specifies the origin of a coordinate system (as a three-dimensional vector), which is defined by the mutually orthogonal vectors $k_1$, $k_2$, and $k_3$. $\lambda_1$, $\lambda_2$, and $\lambda_3$ are the D real-valued parameters of the linear parametric equation. In a particular variant, $k_1$, $k_2$, and $k_3$ may be unit vectors defining a Cartesian vector space with coordinates $\lambda_1$, $\lambda_2$, and $\lambda_3$, in the following referred to as parameter space. Each location of a microphone is uniquely defined by a grouping of 3 parameters $(\lambda_1, \lambda_2, \lambda_3)$. The origin $x_0$ may be placed at the location of one of the plurality of microphones. For lower spatial dimensions D=1 or D=2, the definitions are modified accordingly.

In an embodiment, the D spatial dimensions of the (D+1)-dimensional space-time matrix representation of the acoustic signal may be given by the D parameters of the linear parametric equation. For the one-dimensional case, this corresponds to aligning $k_1$ with the axis along which all of the plurality of microphones are aligned.

The plurality of microphones may be equidistantly arranged along at least one dimension of the D-dimensional parameter space, such that the difference ΔΛ of the corresponding parameter between each two microphones adjacent in the at least one dimension is a constant. However, an equidistant arrangement is not a requirement. For D=2, the plurality of microphones may be located at the nodes of a two-dimensional grid of size $N_1 \times N_2$; for D=3, they may be located at the nodes of a three-dimensional grid of size $N_1 \times N_2 \times N_3$, wherein $N_1$, $N_2$, and $N_3$ are integer numbers larger than 1. Sampling an acoustic signal with a plurality of microphones arranged on the nodes of a D-dimensional grid at a given time thus corresponds to a spatial sampling of the acoustic signal in D dimensions at the given time.

The number N of microphones in the plurality of microphones may be any number, for example, 2, 4, or 8. Equivalently, the number $N_i$ of microphones in the i-th dimension of a multi-dimensional grid may be any number, for example 2, 4, or 8. The number $N_i$ may be any integer number, for instance up to 32 or 64. For example, powers of 2 may be used. The spatial distances of adjacent microphones along at least one of the D spatial dimensions may be chosen such that a characteristic wavelength of the acoustic signal can be sampled with a predefined resolution by the plurality of microphones along the at least one spatial dimension depending on a predetermined range of directions of arrival (DOA), i.e., angles between the one spatial dimension and the directions of arrival. The predetermined range of directions of arrival may, for instance, be given by a 60° range centred around the normal to the one spatial dimension. A characteristic wavelength of the acoustic signal may, for instance, be defined by the characteristic frequency of a voice of a speaker. The distance may, for example, be comparable or smaller than the characteristic wavelength, the more so, if the predetermined range approaches 180°. For equidistantly spaced microphones, the distance may, for example, be less than 10% of the characteristic wavelength. On the other hand, a low-frequency signal, or the low-frequency portion of an acoustic signal, may require a wider microphone array, i.e., in terms of the overall extent of the microphone array along the at least one of the D spatial dimensions in order for its location to be discriminated with better precision. This is due to the longer wavelength of low-frequency signals and to the fact that the precision of a Fourier transform (SNR) increases with the number of sampled periods (Nyquist criterium). The microphone spacing may be chosen according to the above-described constraints depending on the final application and on the a-priori knowledge of the acoustic signal to be processed (i.e., its frequency distribution).

In an embodiment, all of the plurality of microphones may be aligned along a single axis, such that D=1 and the one spatial dimension is aligned with the single axis. This configuration is often called a linear array of microphones.

In an embodiment, the microphones of the plurality of microphones may be equidistantly spaced apart from each other.

For a linear array of microphones, i.e., D=1, the temporally sampled acoustic signal may be represented by a two-dimensional space-time matrix, wherein the line index i may be defined by numbering the plurality of microphones along the linear array and the column index j may be defined by a continuous index of the time points at which the plurality of microphones sample the acoustic signal. With N denoting the number of microphones in the linear array and M denoting the number of temporally sampled signals, i.e., time points, the two-dimensional space-time matrix has dimensions N×M. An embodiment can also be applied to the transpose of the above-defined matrix. Examples of the above-described space-time-matrix representation are described in the detailed description further below. For higher dimensions D=2 or D=3, the space-time-matrix representation may be in the form of a three- or four-dimensional tensor, respectively. With the above-described technique, the sampled acoustic signal may be represented as a (D+1)-dimensional image containing the "spatial signature" of an acoustic event. An embodiment, therefore, may be considered as an image-processing technique applied to an acoustic signal.

The time points defining the time dimension of the (D+1)-dimensional space-time-matrix representation of the sampled acoustic signal may be defined by applying a conventional windowing function to the continuously temporally sampled acoustic signal. Besides a conventional rectangular window, other windowing functions like the Hann window or the Hamming window may be used to enhance the frequency representation and to avoid ringing, artifacts, or side lobes. The selected resolution and dynamic range of the window, as well as the sampling rate $f_s$, may depend on the specific application, for example, on the expected frequency range of the acoustic signal.

In an embodiment, a (D+1)-dimensional windowing function may be applied to the temporally and spatially sampled acoustic signal, i.e., to the acoustic signal which is temporally sampled by a plurality of microphones, to obtain the (D+1)-dimensional space-time-matrix representation of the acoustic signal. The (D+1)-dimensional windowing function may be a separable function, i.e., may be written as the product of windowing functions for each dimension, and may be subject to an overlap-add constraint along the temporal dimension. An overlap-add technique may be employed to efficiently carry out an embodiment for relatively long time sequences. The overlap-add technique may be applied to the temporal dimension of the data, and it is typically required only for beamforming, because it relates to the signal reconstruction after processing. For example, using a sin(t) window along the temporal direction, and any other window in the other D spatial directions, one can apply the same sin(t) window over the monodimensional (time) signal that results from the beamforming operation. This way, a long audio sequence is reconstructed by overlap-add of the various segments that are individually processed by the algorithm. In the case of localization, there is no overlap-add constraint on the chosen signal-analysis window. For the beam-forming operation though, a window operation may be performed both before the transform and after the reconstruction of the beam-formed signal.

To obtain the (D+1)-dimensional space-time-matrix representation of the acoustic signal, the temporally sampled signal values may be interpolated and/or extrapolated to predetermined time points and/or locations in order to enhance the resolution of the representation or to calculate signal values on a predetermined regular grid in the (D+1)-dimensional space (including time). In particular, interpolation and/or extrapolation may be used to compensate for a lack of temporal synchronization of the temporal sampling of the plurality of microphones. Alternatively or in addition, interpolation and/or extrapolation may be used to fill gaps in the (D+1)-dimensional space-time matrix, e.g., if the plurality of microphones does not constitute a regular grid (for D=2 or D=3) or single microphones are missing or defective in a linear array or a regular grid. In an embodiment, the interpolation and/or extrapolation may be carried out according to any conventional method.

According to an embodiment, a (D+1)-dimensional Fourier transform is then applied to the obtained (D+1)-dimensional space-time-matrix representation of the acoustic signal. The (D+1)-dimensional Fourier transform may be carried out in the form of a discrete Fourier transform (DFT) and may be computed efficiently using any conventional fast Fourier transform (FFT) algorithm. In the case of a non-equidistant arrangement of the plurality of microphones and/or irregular temporal sampling, i.e., with varying ΔT between subsequent time points, a conventional non-uniform discrete Fourier transform (NDFT) may be applied instead of the DFT.

The spectrum resulting from application of the (D+1)-dimensional Fourier transform to the (D+1)-dimensional space-time-matrix representation of the acoustic signal may be in the form of a (D+1)-dimensional frequency matrix, representing the spectral distribution of temporal and spatial frequencies of the temporally sampled acoustic signal in a (D+1)-dimensional Fourier space corresponding to the (D+1)-dimensional parameter space, wherein D is the number of spatial frequencies. The resulting spectrum may be interpolated in one or more dimensions of the (D+1)-dimensional Fourier space on predetermined frequencies. The frequency interpolation may be achieved via a number of conventional techniques, such as, for example, by adding leading or trailing zeros to the (D+1)-dimensional space-time-matrix representation in the corresponding dimension before performing the Fourier transform. The frequency interpolation may, however, also be carried out directly on the resulting spectrum, e.g., in order to interpolate the resulting spectrum for the calculation of an integral or sum in the Fourier space (see below).

According to an embodiment, a first peak is then determined in a spectrum which is obtained based on the application of the Fourier transform. Since the Fourier transform of the (D+1)-dimensional space-time matrix representation generally yields complex values, the spectrum may be obtained from the Fourier transformed space-time-matrix representation by calculating the absolute values of the elements of the resulting frequency matrix. Further embodiments are detailed below.

The first peak might be determined in the spectrum obtained based on the application of the Fourier transform using any conventional technique for finding a global or local maximum in the spectrum, for instance, a simple maximum search among the absolute values of frequency matrix. As part of the determination of the first peak, the spectrum may be interpolated to a higher resolution according to a predetermined criterion.

Once a first peak has been determined in the spectrum, the direction of arrival (DOA) of the acoustic signal at at least one of the plurality of microphones is calculated according to an embodiment based on the determined first peak. The first peak may be determined as the global maximum in the spectrum obtained based on the application of the Fourier transform. From the location of the determined first peak in the (D+1)-dimensional Fourier space, an angle or multiple angles may be determined between a line connecting the origin of the Fourier space and the determined first peak and the axis or multiple axes of the spatial frequency dimensions of the Fourier space. The direction of arrival denotes the direction from which a propagating acoustic wave arrives at a point, e.g., the at least one of the plurality of microphones. In the (unrealistic) case of a single acoustic source, without reverberations or echoes from nearby walls or objects, the direction of arrival is given by the connection line between the at least one of the plurality of microphones and the single acoustic source. In the case of a first peak being determined as the global maximum in the spectrum, the direction of arrival will indicate the direction to the dominant, i.e., loudest, acoustic source.

In an embodiment, the direction of arrival of the acoustic signal at the at least one of the plurality of microphones may be calculated based on the determined first peak under the assumptions that a propagating, acoustic plane wave is received by the at least one of the plurality of microphones and that the acoustic plane wave propagates at least in a plane containing at least one source of the acoustic signal and the at least one of the plurality of microphones. The described assumptions may be summarized under the term "far-field assumption." These assumptions include the assumption that the at least one of the plurality of microphones is far enough from a source of the acoustic signal such that the curvature of the wave fronts of the (spherical) wave propagating from the source to the at least one of the plurality of microphones can be neglected at the location of the at least one of the plurality of microphones, i.e., such that the at least one of the plurality of microphones receives a propagating, acoustic plane wave. This assumption is typically valid if the distance between the microphone and the source is much larger, e.g., ten times larger, than a characteristic wavelength of the component of the acoustic signal propagating from the source. A characteristic wavelength may, for instance, be defined by a characteristic frequency of a voice, in the case of a speaker as the source, or of an instrument.

The acoustic signal arriving at the at least one of the plurality of microphones may be a superposition of a whole spectrum of acoustic waves with different frequencies propagating from one acoustic source, the superposition of acoustic waves propagating from multiple acoustic sources, and/or the superposition of reverberations, reflections, and/or echoes, reflected from objects and/or walls to the direction of the at least one of the plurality of microphones.

Ideally, the above-described far-field assumption applies to all of the plurality of microphones, but an embodiment is also applicable if the far-field assumption is only partially or even not at all fulfilled for the plurality of microphones. In such a case, the calculated direction of arrival may deviate from the actual direction of arrival, particularly for strongly asymmetric configurations of the plurality of microphones with respect to the acoustic source. Also, the far-field assumption is ideally fulfilled for all relevant frequencies, i.e., the frequencies to be sampled from the acoustic signal, but a deviation from the far-field assumption, particularly with respect to the lower end of the frequency spectrum, will generally not corrupt the calculated direction of arrival significantly.

The assumed acoustic plane wave may further be assumed to propagate at least in a plane containing at least the one source of the acoustic signal and the at least one of the plurality of microphones. For two or three spatial dimensions (D=2 or D=3), the plane wave assumption may be applied independently for each plane defined by at least the one source of the acoustic signal and at least two of the plurality of microphones, especially those of the plurality of microphones along one of the spatial dimensions of the parameter space. In the case of one spatial dimension, i.e., D=1, the plane may be defined by at least the one source of the acoustic signal and the linear array of microphones.

In an embodiment, the spectrum obtained based on the application of the Fourier transform may be the power spectrum of the Fourier transformed matrix representation, i.e., may be given by the square of the absolute values of the elements of the Fourier transformed matrix representation. In that case, the spectrum represents the spectral density of the temporally sampled acoustic signal, both temporally and spatially.

In an embodiment, the spectrum obtained based on the application of the Fourier transform may be based on a directional energy spectrum of the Fourier transformed matrix representation, wherein the directional energy spectrum may be calculated by integrating or summing the power spectrum of the Fourier transformed matrix representation along a plurality of lines starting from the origin of the (D+1)-dimensional Fourier space of the power spectrum. Under the far-field assumption, each line corresponds to a direction of arrival, i.e., a spatial angle. The plurality of lines may be arranged such that their intersections with a (D+1)-dimensional unit sphere in the (D+1)-dimensional Fourier space are equally distributed over the unit sphere or at least a section of it. In the case of one spatial dimension of the parameter space, i.e., D=1, the unit sphere is a unit circle. As an example, the following angles (DOA) may be used for scanning half the space for acoustic sources: $-90°, -80°, -70°, \ldots, 0°, 10°, 20°, \ldots, 90°$. The integration or sum of the power spectrum along each line may be carried out from the origin of the Fourier space to infinity or to a predetermined distance from the origin, which may depend on the application, i.e., the specific characteristics of the acoustic source, i.e., its frequency range. In order to carry out the integration, the Fourier transformed matrix representation or the spectrum may be interpolated to a higher resolution or onto predetermined points on the lines of integration/sum. The number of lines in the plurality of lines may be predetermined or adapted to the specific characteristics of the acoustic source and/or the targeted range of directions of arrival. An example for the calculation of a directional energy spectrum is given below in the detailed description section. The above-described embodiment of integrating/summing along predefined lines of arrival corresponds to beam forming over a selected set of predefined angles. It may, in particular, be adopted in cases where the acoustic signal is not expected to show a discernible peak in its Fourier spectrum (e.g., white noise).

Here and in the following, the Fourier transformed matrix representation denotes a representation of a discrete Fourier transformed function on a regular, (D+1)-dimensional grid in the corresponding (D+1)-dimensional Fourier space, i.e., includes D+1 one-dimensional vectors representing the coordinates of the grid nodes in the corresponding dimension and constituting together the regular (D+1)-dimensional grid and the elements of the (D+1)-dimensional matrix representation of the Fourier transformed function. For the (D+1)-dimensional Fourier transformed matrix representation, D dimensions are Fourier transformed spatial dimensions, i.e., in reciprocal space, while one dimension is the temporal frequency dimension. In the present case, the D dimensions in reciprocal space correspond to Fourier transforms of the D spatial dimensions of the (D+1)-dimensional space-time-matrix representation.

In an embodiment, the first peak in the spectrum is determined by determining a global maximum in the spectrum. As stated above, any conventional technique may be used to determine the global maximum.

The above-described embodiment may further include localizing at least one further source of the acoustic signal by determining at least one further peak in the spectrum and calculating at least one further direction of arrival of the acoustic signal at the at least one of the plurality of microphones based on the least one further determined peak. As stated above the acoustic signal arriving at the plurality of microphones may be a superposition of multiple signal components propagating from more than one acoustic source plus potential reflections, reverberations, and/or echoes. In such a case, the spectrum will generally show several isolated maxima, wherein the larger maxima can usually be associated with the acoustic sources and the smaller maxima can be associated with reflections and/or harmonics in the frequency spectrum of the acoustic signal.

By localizing at least one further source of the acoustic signal, an embodiment allows for isolating more than one individual acoustic source, e.g., more than one speaker in a group of people in a conference room, wherein more than one speaker speaks at the same time. This may be relevant in situations where acoustic information of a tele- or video-conference is transmitted via a plurality of microphones.

In an embodiment, the at least one further determined peak in the spectrum has a value larger than a predetermined threshold. By defining a threshold, below which peaks in the spectrum are not considered, reflections, noise, and/or harmonics can be excluded. This may be particularly advantageous in confined spaces like the interior of a vehicle and in places where a constant background noise, like the humming of an engine, is common. The threshold criterion may also be applied to the first determined peak such that a highly noisy environment will deliver a negative result when trying to localize a sound source. Such a situation may, for instance, occur in a vehicle during speech-free intervals, e.g., during hands-free telephone calls. The predetermined threshold may be computed adaptively or as a function of the application, e.g., the specific characteristics of an acoustic source or a specific setting like a conference room, and/or the sensitivity of individual microphones in the plurality of microphones.

In an embodiment, the (D+1)-dimensional frequency matrix resulting from application of the (D+1)-dimensional Fourier transform to the (D+1)-dimensional space-time-matrix representation of the acoustic signal may be repeated for a predetermined number of times along at least one spatial frequency axis before determining a peak in the spectrum. The repetition may be carried out by a simple spatial translation of the original (D+1)-dimensional frequency matrix by the dimension of the frequency matrix along the corresponding spatial frequency dimension, and may be carried out in the positive and/or negative direction. In particular, a single repetition of the frequency matrix in both the positive and the negative directions of at least one spatial-frequency axis may be carried out. In one particular embodiment, a repetition of the frequency matrix may be performed along all spatial frequency axes. The resulting extended frequency matrix may then replace the original frequency matrix for all subsequent method steps, including an embodiment for beam forming as described below.

Repetition of the frequency matrix along at least one spatial frequency dimension allows for removal of spurious peaks due to aliasing along this spatial frequency dimension by considering the energy distribution along the directions of arrival of determined peaks.

In a theoretical case of a purely sinusoidal signal, spurious peaks due to spatial aliasing may be removed by considering, where applicable, further constraints/hypotheses on the actual position of the source. If the signal has a spectral content spread over more than a single FFT frequency bin, its energy may be computed by integrating the spectrum along the DOA, based on a similar reasoning as for beam forming. In this case, disambiguation can be done, for example, by integrating the spectrum along the two possible DOAs and choosing the one giving the higher value, or alternatively by searching for a secondary peak along the two DOAs and selecting the DOA with the higher peak.

Alternatively or additionally, the spectrum obtained based on the application of the Fourier transform to the (D+1)-dimensional space-time matrix representation may be reduced to a predetermined range of directions of arrival (DOAs) prior to determining a peak in the spectrum. The reduction of the spectrum may be carried out by setting the spectrum to zero outside the predetermined range of DOAs. The predetermined range of DOAs may be specified independently in any of the spatial dimensions and may be selected based on an expected range of DOAs. As an example, an expected range of DOAs in a video-conferencing room may be given by the relative arrangement of the plurality of microphones and the participants. In particular, a reduction of the spectrum may already be achieved by considering the maximum range of allowed DOAs, given by limiting the spatial angle in each spatial dimension to values between −90° and +90° (see discussion below). The reduced spectrum may replace the original spectrum in all consecutive steps of an embodiment.

By reducing the spectrum to a predetermined range of DOAs prior to determining a peak, 'false positive' peak detections, i.e., detection of sources which do not correspond to actual sound sources, can be partially or fully avoided. Peaks outside the predetermined range, in particular outside the maximum range, i.e., in the 'forbidden region' of the spectrum, may be due to the presence of secondary sound sources that are relatively close to the microphone array and violate the assumption of 'far field'. Examples of a secondary disturbing source include echoes and reverberations generated by surfaces (tables, walls) close to the microphone array. Avoiding the search for peaks in the 'forbidden' region of the spectrum also reduces the computational cost of an embodiment.

An embodiment may further including beam forming of a plurality of microphones by subsequently performing the following steps:

determining at least one line extending from the origin of the (D+1)-dimensional Fourier space of the spectrum through at least one determined peak and including predetermined points;

interpolating and/or extrapolating the Fourier transformed matrix representation in the (D+1)-dimensional Fourier space onto the predetermined points to obtain at least one one-dimensional spectrum, wherein the frequency values of the at least one one-dimensional spectrum are given by the temporal frequency values of the predetermined points; and computing at least one directional acoustic signal by applying a one-dimensional inverse Fourier transform to the at least one one-dimensional spectrum.

The at least one determined peak may be any of the determined first peak or the at least one further determined peak. The predetermined points along the at least one line may be determined by taking the discrete values of the temporal frequency corresponding to the elements in the Fourier transformed matrix representation and determining the corresponding spatial frequencies such that the resulting points lie on the at least one line, i.e., such that the taken discrete temporal frequencies and the corresponding spatial frequencies fulfil a linear equation which describes the at least one line in the (D+1)-dimensional Fourier space. Alternatively, any set of points along the at least one line, equidistantly distributed or not, may be chosen. The interpolation/extrapolation of the Fourier transformed matrix representation may be done according to any conventional technique. The discrete function represented by the Fourier transformed matrix representation in the Fourier space as described above is interpolated and/or extrapolated to yield a continuous function in the Fourier space which may be evaluated at the predetermined points (see also detailed description below). Since the Fourier transformed matrix representation is generally complex-valued, the interpolation/extrapolation is generally performed for both real and imaginary parts of the Fourier transformed matrix representation. The obtained at least one one-dimensional spectrum may be in the form of a complex-valued vector which can be regarded as the FFT of the output of a single-channel beam former.

By applying a one-dimensional inverse Fourier transform to the obtained at least one one-dimensional spectrum, at least one directional acoustic signal is obtained as the output of the single-channel beam former. Generally, the resulting signal will not be real-valued due to errors introduced by the performed interpolation/extrapolation, but will have relatively small imaginary components. The imaginary components may be suppressed by a more precise interpolation, by imposing symmetry constraints to the obtained at least one one-dimensional spectrum which guarantee a real-valued inverse Fourier transformed signal, as is known, or by keeping only the real part of the inverse Fourier transformed one-dimensional spectrum. Overlap and add methods may be applied to reconstruct a continuous directional acoustic signal as described above.

An embodiment for beamforming may further include the following steps:

selecting at least one directional acoustic signal based on characteristics of the respective obtained one-dimensional spectrum; and outputting the selected at least one directional acoustic signal.

Since the obtained one-dimensional spectrum ideally represents the acoustic signal from a single acoustic source in the direction of arrival, it may be used to direct the reception by the plurality of microphones at a specific acoustic source, e.g., a specific speaker in a conference room. Various characteristics of the obtained one-dimensional spectrum, such as pitch, range, central frequency, dominant frequencies, cepstral coefficients, etc., or recognition of female/male/child speaker, voice recognition results, etc., may be used to select at least one directional acoustic signal out of a plurality of directional acoustic signals corresponding to a plurality of acoustic sources. This allows directing the reception of the plurality of microphones at a particular person in a group of participants at a tele- or video-conference, rather than always focusing on the dominant, i.e., loudest speaker. Also, a predetermined constraint on the range of the accepted direction of arrival may be used as a characteristic to select at least one direction acoustic signal. This may be relevant in a situation where the speaker is located at a predetermined and fixed position, e.g., the driver in a car using a hands-free telecommunication device or the presenter in a conference room.

If more than one directional acoustic signal has been computed according to one of the above-described embodiments, also more than one directional acoustic signal may be selected based on characteristics of the respective obtained one-dimensional spectra. The selected directional acoustic signals may be superposed or otherwise combined and then output from a processing unit, transmission line, high speaker, or similar. An embodiment thus allows for selecting and outputting an acoustic signal from more than one source, e.g., from the presenter in a conference and a member of the audience asking a question, while screening all other ambient sounds, like, for instance, murmuring of other members of the audience, background noise from technical equipment like air conditioning, fans, or projectors, or from other sources of noise, e.g., street noise. Hence, the sound quality of the selected and possibly transmitted or recorded acoustic signal can be significantly improved.

Additionally, certain filters like anti-echo-filters, babble-noise-filters, other noise filters, etc., may be applied to the temporally sampled acoustic signal, the Fourier transformed matrix representation, or the obtained spectrum to improve the signal quality and/or the SNR.

An embodiment includes a device for localizing at least one source of an acoustic signal, the device including:

a plurality of microphones adapted to temporally sample the acoustic signal; and a processing unit coupled to the plurality of microphones and configured to carry out the following steps:

obtaining a (D+1)-dimensional space-time matrix representation of the acoustic signal, wherein D is the number of spatial dimensions;

applying a (D+1)-dimensional Fourier transform to the matrix representation;

determining a first peak in a spectrum obtained based on the application of the Fourier transform; and calculating the direction of arrival of the acoustic signal at at least one of the plurality of microphones based on the determined first peak.

The same variants and/or extensions of the steps for the localization of an acoustic source and for acoustic beamforming as described above may also be carried out by the processing unit. As described above, the microphones may, for example, be digital microphones. The processing unit may be a central processing unit (CPU), a graphics processing unit (GPU), a task-specific processor, or any dedicated integrated circuit. The steps of an embodiment for beam forming as described above may also be carried out by the processing unit in order to control the directionality of the reception of an acoustic signal by the plurality of microphones.

By providing two independent linear arrays of microphones and performing an above-described embodiment for determining the direction of arrival of an acoustic signal emitted from an acoustic source, the exact, or approximately exact, location including distance of the acoustic source in a plane may be determined by intersecting the two lines representing the directions of arrival. Using three independent linear arrays, an exact, or an approximately exact, location of the acoustic source can be determined in three-dimensional space.

Furthermore, in an embodiment, a computer program product may include one or more computer readable media having computer-executable instructions for performing the steps of any of the above-described embodiments.

Finally, an embodiment includes an electronic device including the above-described device, wherein the electronic device is selected from the group of a teleconference system, a video-conference system, a hands-free telecommunication set suitable to be installed in a vehicle, an automotive communication system, and a directional microphone system.

An embodiment of a method and a device allow for a simple and effective way of localizing one or more sources of an acoustic signal and acoustic beamforming for a microphone array. By performing beamforming according to an embodiment, the noise received by a typical microphone array, consisting of omni-directional microphones, can be significantly reduced. Through an embodiment, the array of omni-directional microphones behaves as a single directional microphone, and the acoustic beam can be steered towards the speaker or the speakers in order to maximize the reception in the direction of the speaker(s), and to attenuate unwanted sounds coming from any other direction.

The complexity of an embodiment is lower than that of one or more conventional methods, while the performance, in the case of simultaneous localization and beamforming, is at least comparable to one or more conventional methods. An embodiment outperforms one or more conventional methods in the case of a large number of microphones and also in the case of simultaneous localization and beamforming in multiple directions, e.g., for multiple speakers or other acoustic sources. An embodiment is superior in terms of performance, i.e., speed and quality, if compared to one or more conventional techniques of equivalent simplicity. Due to its simplicity and low requirements, an embodiment can be implemented easily and produced at a relatively low cost.

BRIEF DESCRIPTION OF THE DRAWINGS

Features and advantages of exemplary embodiments will be explained in detail with respect to the drawings. It is understood that the description of the above and following embodiments is not limiting. It should furthermore be understood that some or all of the features described in the above or in the following may also be combined in alternative ways.

between adjacent microphones according to an embodiment.

Figure 3:
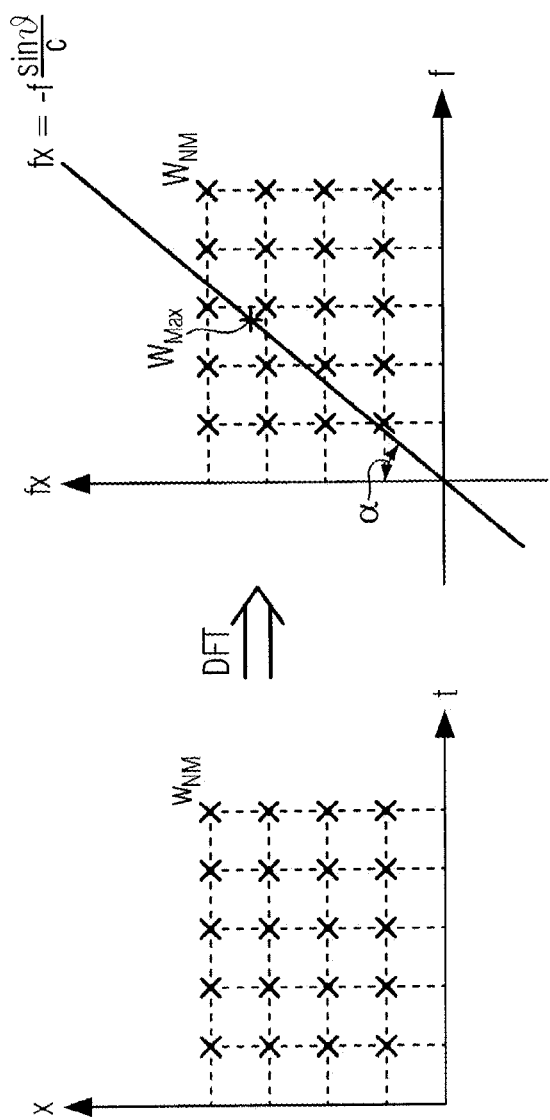

FIG. 3 is a diagram of a Fourier transform of a space-time matrix representation together with a line through a global peak in the resulting spectrum, according to an embodiment.

Figure 4:
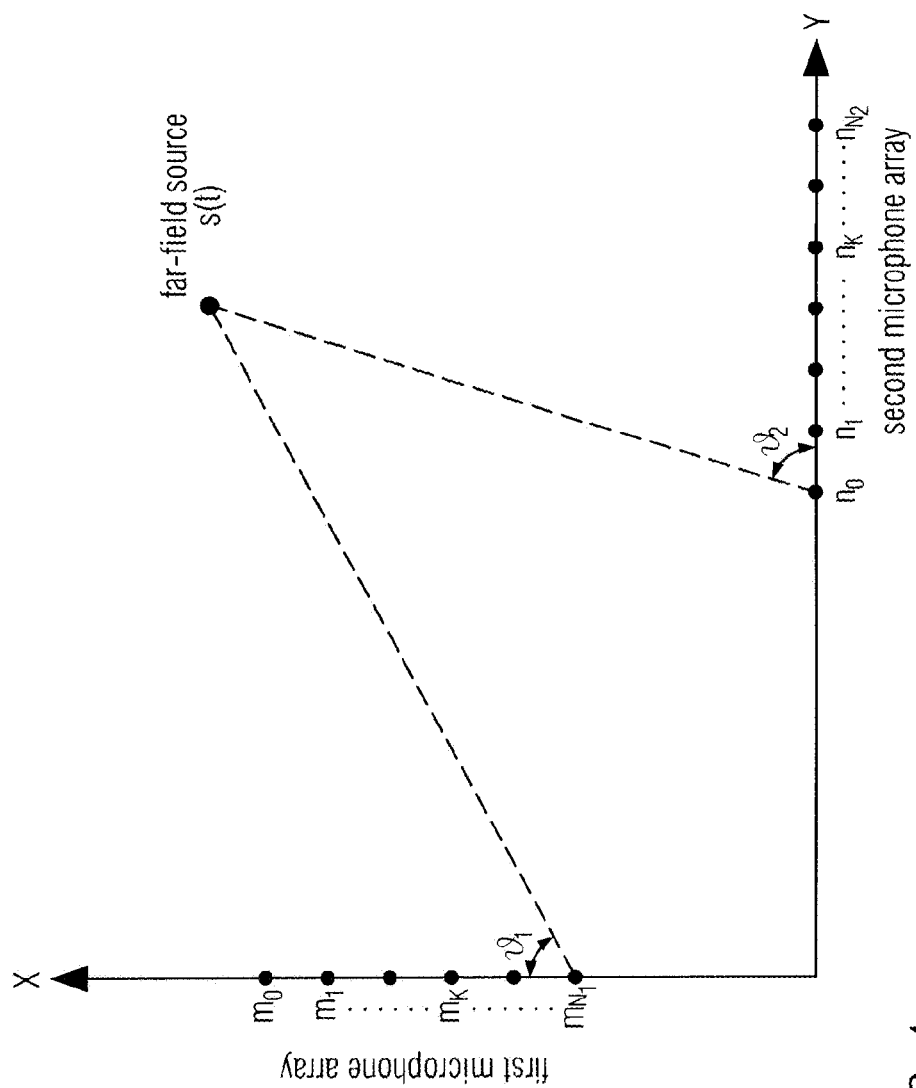

FIG. 4 is a diagram of an application of an embodiment for source localization to two independent and crossed linear arrays to determine the distance of a source, according to an embodiment.

Figure 5:
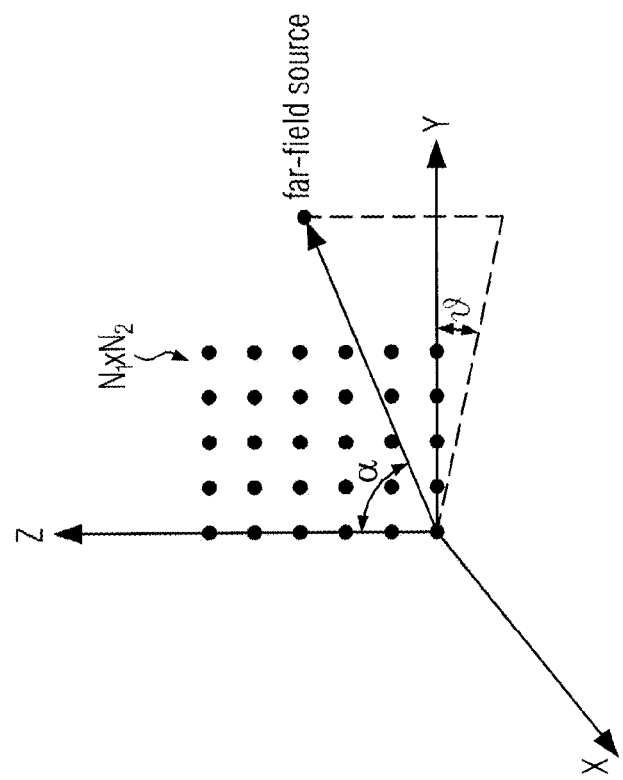

FIG. 5 is a diagram of localization of a source in three-dimensional space by a two-dimensional microphone array, according to an embodiment.

Figure 6:
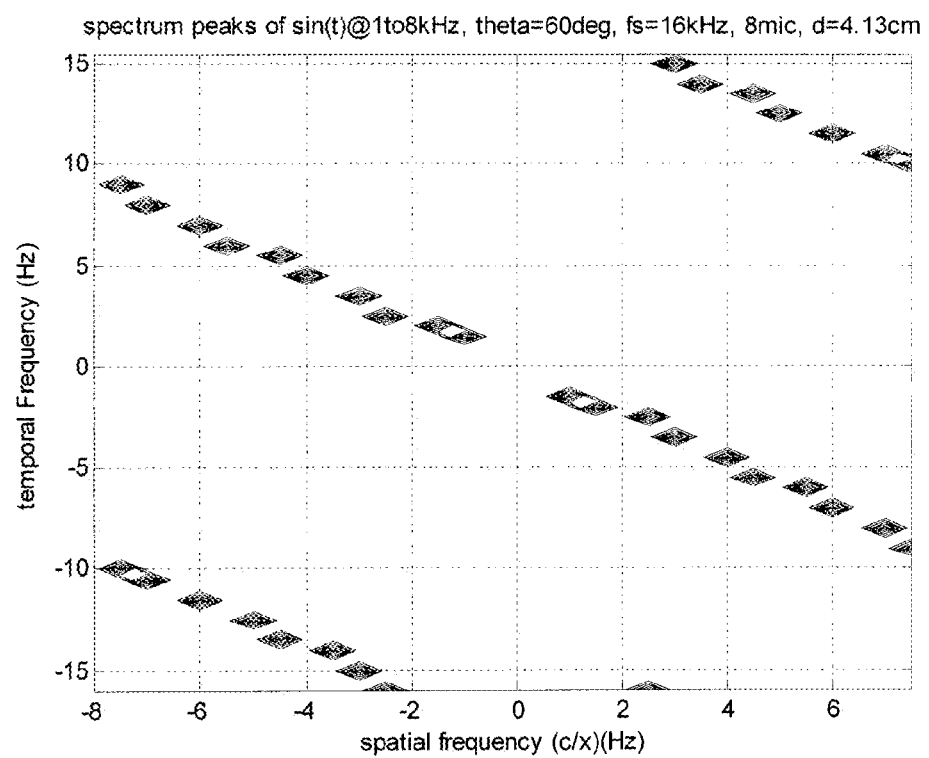

FIG. 6 is a diagram of a two-dimensional FFT frequency matrix for a sinusoidal signal frequency sweep at a DOA of 60°, according to an embodiment.

Figure 7:
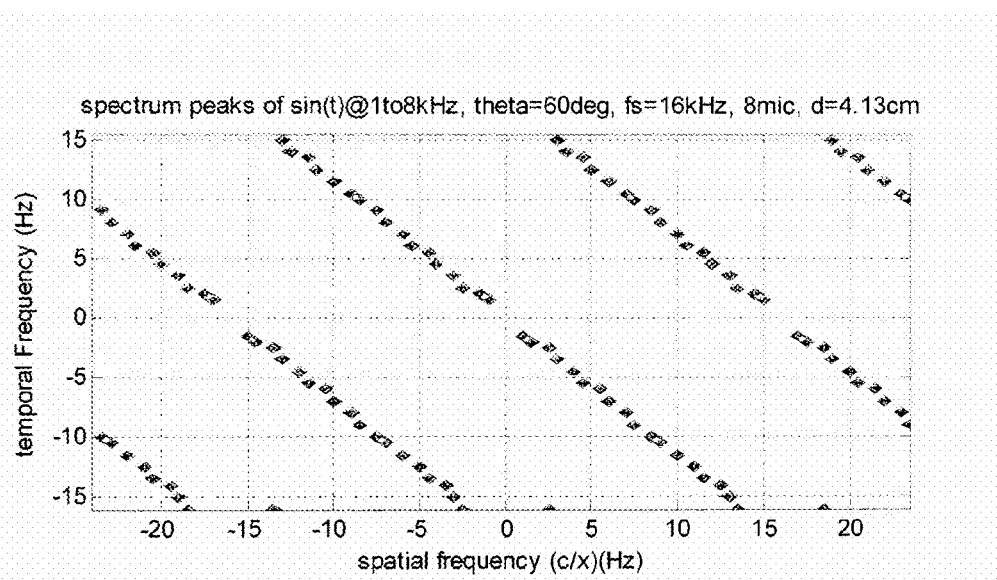

FIG. 7 is a diagram of the two-dimensional FFT frequency matrix of FIG. 6 after repetition along the spatial frequency axis, according to an embodiment.

Figure 8:
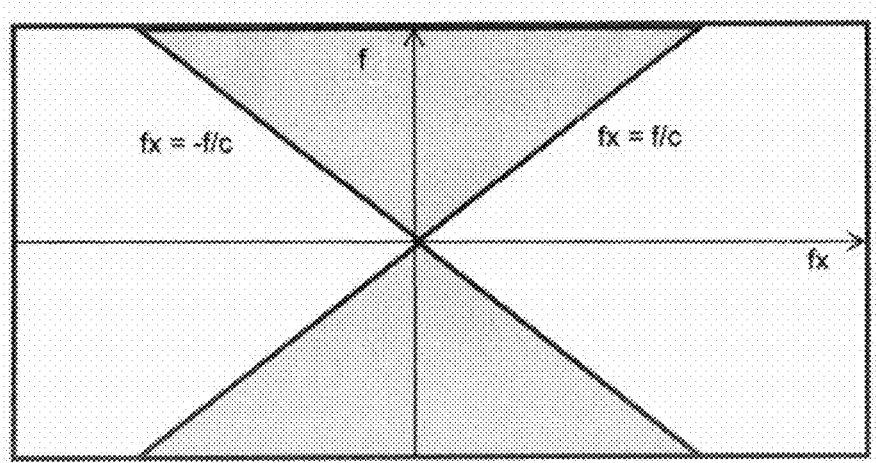

FIG. 8 is a diagram of 'allowed' and 'forbidden' regions for a one-dimensional microphone array, according to an embodiment.

DETAILED DESCRIPTION

Sound propagation can be described mathematically by the solutions of the generalized wave equation for acoustic waves, a quite complex equation which, for the practical cases of interest in acoustics, can be simplified by the assumption of an ideal fluid with zero viscosity.

A spherical wave solves the differential wave equation for the case of omni-directional sound propagation from a monochromatic point source:

$$x(t, r) = -\frac{A}{4\pi r}e^{j(\omega t - kr)} \tag{2}$$

where $r=|r|$ is the radial distance from the source, k is the scalar wavenumber, given by $2\pi/\lambda$, and $x(t, r)$ is a function representing the sound pressure at a point in time and space. The spherical wave solution shows signal amplitude decaying at a rate proportional to the distance from the source. In most sound-source localization and beam-forming applications, however, the far-field assumption is adopted: it is assumed that the signal sources are located far enough away from the array that the waveforms impinging on the array can be modeled as plane waves. In this case, the solution to the differential wave equation for a monochromatic wave is:

$$x(t,r)=A\ e^{j(\omega t - k \cdot r)} \tag{3}$$

where A is the wave amplitude, $\omega=2\pi f$ is the frequency in radians per second, and the wavenumber vector k indicates the wave's spatial frequency and direction of propagation, from which the direction of arrival may be derived.

Due to the linearity of the wave equation, a monochromatic solution can be expanded to the more general polychromatic case by considering the solution as a sum or integral of such complex exponentials. By introducing a new variable $u=t-k \cdot r/\omega$, the spherical wave can be written as:

$$x(r, u) = -\frac{A}{4\pi r}e^{j\omega u} \tag{4}$$

And a plane wave becomes:

$$x(u)=A\ e^{j\omega u} \tag{5}$$

As a conclusion, it may be observed that a band-limited signal can be reconstructed over all space and time by either:

temporally sampling the signal at a given location in space, or spatially sampling the signal at a given instant of time.

In the following, an embodiment is illustrated by means of a simple, one-dimensional linear array of microphones, i.e., D=1. An embodiment can, however, easily be generalized to two- and three-dimensional arrays by introducing additional angles for the direction of arrival and carrying out a corresponding higher-dimensional Fourier transform.

Figure 1:
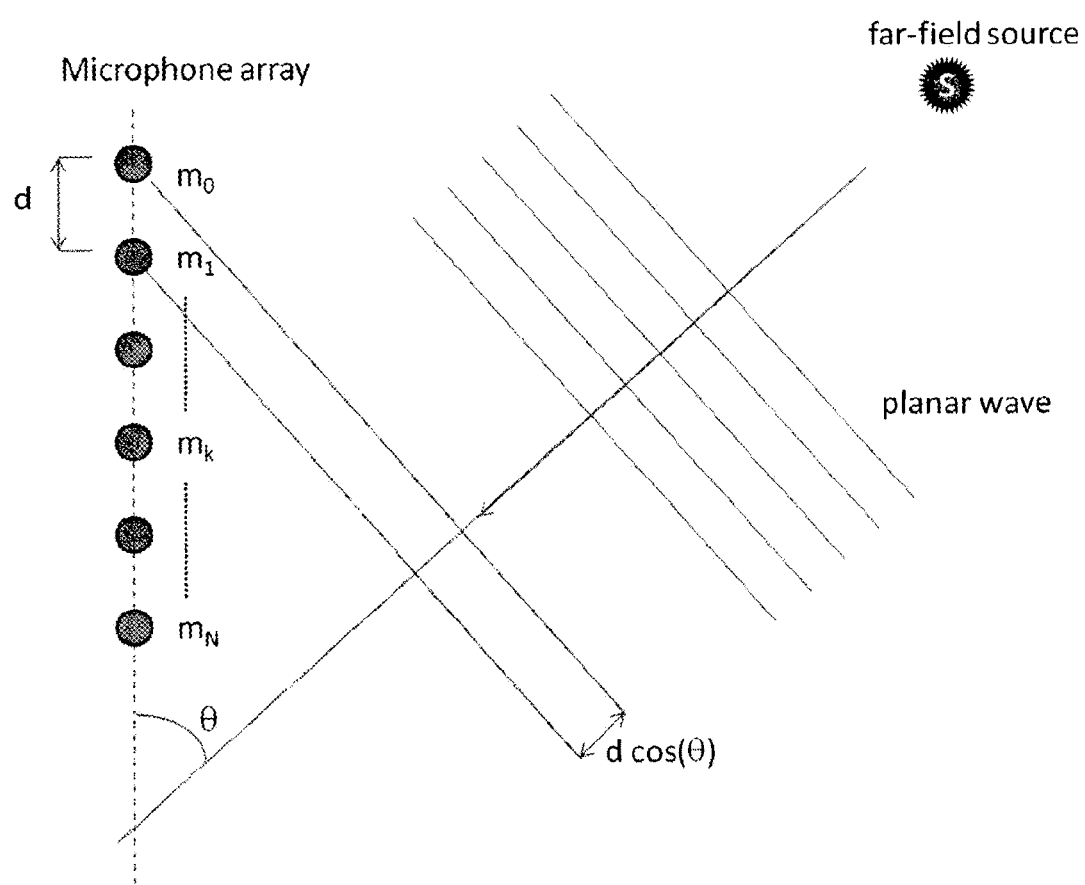
FIG. 1 is a diagram of a linear microphone array receiving a planar wave from a far-field source according to an embodiment.

Consider a linear array (i.e., D=1) of N microphones as depicted in FIG. 1, placed uniformly along a straight line so that the distance between microphones $m_n$ and $m_{n+1}$ is d. The overall length of the array is d×(N−1).

Figure 2:
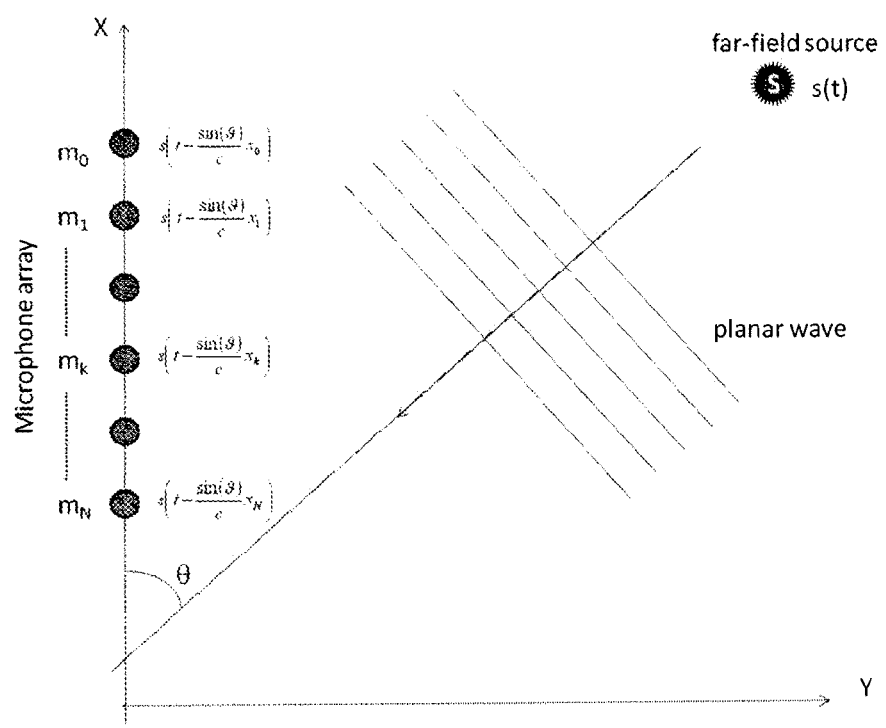
FIG. 2 is a diagram of a linear microphone array sampling a sinusoidal signal with a phase difference $$\frac{d}{c}\sin\vartheta$$

A source S placed at polar coordinates ($\theta_s$, $\alpha_s$, $r_s$) has Cartesian coordinates $$x_s = r \sin\theta_s \sin\alpha_s \quad (6)$$

$$y_s = r \cos\theta_s \sin\alpha_s \quad (7)$$

$$z_s = r \cos\alpha_s \quad (8)$$

where $\theta_s$ is the angle to the y-axis. A propagating acoustic wave produced by a far-field source can be represented as a planar wave in a plane containing the microphone array and the sound source, as shown in FIG. 2.

The Cartesian coordinate system may be oriented such that the linear array lies along the X axis and the source lies on the XY plane, i.e., $\alpha_s = \pi/2$. Without loss of generality, microphone $m_0$ can be placed at the origin of the coordinate system such that the Cartesian coordinates of microphone $m_n$ will be $y_n=0$, $x_n=n\times d$.

At time t, microphone $m_n$ (n=0, . . . , N−1) will sample the planar wave as $$w_n(t) = A\sin\left[\omega\left(t - \frac{1}{c}(nd\sin\vartheta)\right)\right] \quad (9)$$

It can easily be observed that in this case, different microphones will sample sinusoidal waves with the same frequency but with different phases. The phase difference is caused by the propagation delay of the acoustic signal moving at speed c in the direction $\theta$ and is equal to $$\Delta\phi_m = 2\pi(m/\lambda)\sin\theta = 2\pi f(m/c)\sin\theta \quad (10)$$

m being the distance between the two microphones.

In the case of a generic complex (non-monochromatic) acoustic signal, it can be easily shown by means of geometrical analysis that the delay between the signals captured by different microphones is (nd sin θ)/c, which is consistent with the above equation (10). Two microphones at distance δ will receive, respectively, the sound signals f(t) and $$f\left(t - \frac{1}{c}(\delta\sin\vartheta)\right),$$

θ being the direction of arrival (DOA) of the sound wave, i.e., the angle to the y-axis in FIG. 2.

With the present approach, the source of an acoustic signal is localized by considering spatial and temporal sampling together by means of a two-dimensional (D+1) Fourier transform over the temporal and spatial dimensions of the signal.

To this end, the N individual sampled acoustic signals, captured during a timeframe ΔT comprising M time points by a digital microphone array (N=number of microphones in the array) as a single bi-dimensional (D+1) signal, can be represented in matrix form as the space-time matrix representation $$w_{NM} = \begin{pmatrix} w_0(t_0) & \cdots & w_0(t_{M-1}) \\ \vdots & \ddots & \vdots \\ w_{N-1}(t_0) & \cdots & w_{N-1}(t_{M-1}) \end{pmatrix} \quad (11)$$

where, if $f_s$ is the temporal sampling frequency, $t_i = t_0 + i/f_s$, and $M/f_s = \Delta T$. It may be noticed that row j of matrix $w_{NM}$ represents a temporal sampling of the acoustic wave in the geometrical position of microphone $m_j$, and column i represents a spatial sampling of the same wave at instant $t_i$. An example of such a space-time matrix representation is depicted in FIG. 3 on the left-hand side. The crosses indicate the coordinates in space (x) and time (t) of the elements of the matrix forming a regular grid (two-dimensional for a linear microphone array). To change the resolution of the grid or to calculate the signal w(t, x) on a different grid, the values of the space-time matrix representation $w_{NM}$ can be interpolated and/or extrapolated and the interpolation/extrapolation function evaluated on the new grid.

The space-time signal representation of the signal given by matrix w can be treated as a two-dimensional signal (e.g., an image) that contains a "signature" of the DOA.

Rewriting eq. (9) for a monochromatic wave at frequency $\omega = 2\pi f$ as $$w_n(t) = w(t, x_n)|_{y_n=0} \quad (12)$$

$$= A\sin\left[2\pi f\left(t - \frac{x_n \sin\vartheta}{c}\right)\right]$$

$$= A\sin\left[2\pi ft - 2\pi f\frac{\sin\vartheta}{c}x_n\right]$$

it can be clearly seen that at each given instant t, N microphones sample a sinusoidal signal with a spatial frequency $f_x$ (in $m^{-1}$)

$$f_x = -\frac{f\sin\vartheta}{c} \quad (13)$$

where DOA range is bounded as $-\pi_2 < \theta < \pi/2$ because of system symmetry. This formula describes a line in the two-dimensional Fourier space with dimensions f and $f_x$ (temporal frequency and spatial frequency) and can be used to compute the DOA for a monochromatic wave of known temporal frequency f and of known array-sampled spatial frequency $f_x$.

In the general case of a complex, non-monochromatic signal, the signal may be considered as the sum of sinusoidal signals by means of Fourier analysis and it may be observed that, as a consequence of the above, the two-dimensional Fourier transform of matrix w will concentrate all the signal energy along the straight line represented by the above equation (13). This will be demonstrated in the following.

By notating as w(t, x) the plane wave continuous time-space function corresponding to w(t, x, y)|$_{y=0}$, its two-dimensional Fourier transform may be written as W(f, $f_x$).

Let s(t) be the sound waveform emitted by the source, and S(f) its Fourier transform.

$$s(t) \to S(f) = \int s(t)e^{-j2\pi ft}dt \quad (14)$$

The signal received by the microphone array at coordinate ($x_n$, $y_n$=0) can be expressed as $$s\left(t - \frac{1}{c}(x_n \sin\vartheta) + \varphi_0\right) \quad (15)$$

where $\theta_0$ is the phase accounting for the propagation delay between the source and the origin of the Cartesian reference coordinate system (0,0), which is arbitrarily set to 0 without loss of generality in the following, see FIG. 2.

It is known that the Fourier transform of signal s(at+bx), where a and b are arbitrary constants is the following:

$$s(at+bx) \rightarrow \frac{1}{a}S\left(\frac{f}{a}\right)\delta\left(f_x - f\frac{b}{a}\right) \quad (16)$$

Via the substitutions a=1, b=−sin θ/c, the following result is obtained:

$$w(t,x) = s\left(t - \frac{\sin\vartheta}{c}x\right) \rightarrow S(f)\cdot\delta\left(f_x + f\frac{\sin\vartheta}{c}\right) \quad (17)$$
$$= W(f, f_x)$$

Thus the two-dimensional Fourier transform $W(f, f_x)$ of signal w(t, x) will show the original spectrum S(f) of the signal s(t) concentrated along the straight line $f_x = -f \sin\theta/c$, as shown in FIG. 3. In the general case of a non-monochromatic (i.e., a non-singular-tone or non-singular-frequency) signal, an extended frequency spectrum of the signal will be concentrated along the straight $f_x = -f \sin\theta/c$.

Exploiting these results, sound-source localization can be achieved by either of the following methods:

1) If a peak (global or local maximum) can be clearly identified in the power spectrum $|S(f)|^2$ of signal s(t), then a corresponding peak will exist in the two-dimensional FFT of space-time matrix w. The DOA can then be calculated from the coordinates $(f, f_x)$ of such a peak as:

$$\vartheta = \sin^{-1}\left(-\frac{f_x c}{f}\right). \quad (18)$$

It should be noted that multiple peaks, or local maxima, may be present, indicating multiple sound sources with different DOA (e.g., sources that are not aligned on the same θ).

2) Alternatively, in the Fourier space $(f, f_x)$, the energy of signals coming from all possible angles θ may be computed by integrating the power spectrum $|\breve{W}(\rho,\alpha)|^2$ of the Fourier transformed space-time matrix representation along the corresponding lines (see below). The location of the source can then be determined as the angle θ corresponding to the maximum energy. By the following substitution, it is:

$$f = \rho \sin \alpha \quad (19)$$

$$f_x = \rho \cos \alpha \quad (20)$$

$$W(f, f_x) = W(\rho \sin\alpha, \rho \cos\alpha) = \breve{W}(\rho, \alpha) \quad (21)$$

The directional energy of an acoustic signal incoming from direction α can be expressed as:

$$E(\alpha) = \int |\breve{W}(\rho,\alpha)|^2 d\rho \quad (22)$$

Hence, a directional energy spectrum can be calculated by integrating the power spectrum along all directions α. The maximum $\bar{\alpha}$ of the directional energy spectrum E(α) will determine the DOA based on the following equation:

$$\vartheta = \sin^{-1}\left(-\frac{f_x c}{f}\right) = \sin^{-1}\left(-c\frac{\cos\bar{\alpha}}{\sin\bar{\alpha}}\right) = \sin^{-1}(-c\cot\bar{\alpha}) \quad (23)$$

It is noted that in case of multiple acoustic sources reaching the microphone array from different angles, they will appear in function E(α) as multiple local maxima. In this case, the previous formula (23) can be applied to each local maximum in order to compute the DOA of each sound source.

From what has been discussed in the previous sections, in presence of several acoustic sources disposed along different angles of arrival, the two-dimensional Fourier transform of signal w will be a generic curve with complex values spread in the plane $(f, f_x)$. In this case, beam forming may be achieved by isolating all those space-time frequency components that are due to a source placed spatially at a defined angle θ and by computing the original signal s(t) as the inverse Fourier transform of those frequency values.

This can be achieved by exploiting the following equation, which was explained previously:

$$w(t,x) = s\left(t - \frac{\sin\vartheta}{c}x\right) \rightarrow S(f)\cdot\delta\left(f_x + f\frac{\sin\vartheta}{c}\right) = W(f, f_x) \quad (24)$$

In the general case of a microphone array capturing audio in a generic reverberating environment, the multi-microphone signal w(t, x) will contain signal $$s\left(t - \frac{\sin\vartheta}{c}x\right)$$

generated by a far field source at DOA θ summed to another signal generated by any other acoustic source, direct or reverberated, captured by the microphone array.

By isolating those frequency components that lie along the straight line defined by the equation $$f_x = -f \sin \theta/c \quad (25)$$

$$S(f)\cdot\delta\left(f_x + f\frac{\sin\vartheta}{c}\right)$$

the contribution given by is separated out along with some error signals that may be coming from various sources, such as, for example: near-field sources, or other sources aligned with the DOA θ, e.g., other persons in front of the speaker in an audience.

Considering such errors negligible, it may be assumed that the signal transform S(f) is obtained by evaluating the function $W(f, f_x)$ for all those points $(f, f_x)$ that satisfy the equation (25).

In the practical case of a discrete function represented by the space-time matrix $$w_{NM} = \begin{pmatrix} w_0(t_0) & \cdots & w_0(t_{M-1}) \\ \vdots & \ddots & \vdots \\ w_{N-1}(t_0) & \cdots & w_{N-1}(t_{M-1}) \end{pmatrix} \quad (26)$$

and its discrete Fourier transform (DFT)

$$W_{NM} = \begin{pmatrix} W(f_0, f_{x,0}) & \cdots & W(f_{M-1}, f_{x,0}) \\ \vdots & \ddots & \vdots \\ W(f_0, f_{x,N-1}) & \cdots & W(f_{M-1}, f_{x,N-1}) \end{pmatrix} \quad (27)$$

frequency values corresponding to equation (25) in general will not be directly available from matrix $W_{NM}$, and so they will have to be computed by interpolation from adjacent frequency values. An example of such a Fourier transformed matrix representation is depicted in FIG. 3 on the right-hand side. The crosses indicate the coordinates of the elements of the matrix in Fourier space, with the temporal frequency (f) and the spatial frequency ($f_x$) as dimensions, forming a regular grid (two-dimensional for a linear microphone array). To change the resolution of the grid or to calculate the Fourier transformed signal $W(f, f_x)$ on a different grid, e.g., on the straight line in FIG. 3 to perform beam forming, or on a line for carrying out the integral in equation (22), the values of the Fourier transformed matrix representation $W_{NM}$ can be interpolated and/or extrapolated in the Fourier space and the interpolation/extrapolation function evaluated on the new grid.

By applying the described embodiment for localizing a source to two independent and crossed linear arrays of microphones, an approximate distance (due to the constraints of the far-field assumption) of the sound source from each array can be determined on top of the direction of arrival. FIG. 4 shows two linear microphone arrays $m_0, \ldots, m_{N1}$ and $n_0, \ldots, n_{N2}$ with $N_1$ and $N_2$ microphones, respectively. The microphone arrays are aligned with the X and Y axes, respectively. If the above-described embodiment for localizing a source is applied independently to the two linear arrays, two independent directions of arrival $\theta_1$ and $\theta_2$ can be computed from which the approximate distance of the source can be easily calculated by determining the crossing point of the two corresponding lines.

FIG. 5 demonstrates the localization of a source in three-dimensional space by use of a two-dimensional microphone array consisting of $N_1 \times N_2$ microphones which are arranged on the nodes of a regular grid in the YZ-plane. The Fourier transform $W(f, f_y, f_z)$ of the three-dimensional (D=2) space-time matrix representation w(t, y, z) of the acoustic signal sampled by the two-dimensional microphone array includes two δ-functions equivalent to the one described above which define the two angles α and θ needed for the localization of the source in three dimensions.

Due to the finiteness of the speed c of the acoustic signal, spatial aliasing may occur in the spectrum resulting from the Fourier transform as described above. Considering an acoustic wave travelling at speed c and a direction of arrival DOA=θ, the array of microphones captures, at every sampling time, spatial samples of the wave such that two consecutive samples (e.g. those samples captured by two neighbouring microphones) are d sin θ/c seconds apart with reference to the phase of the wave. Thus, as discussed above, spatial sampling is equivalent to temporal sampling with the frequency $$(\text{in } s^{-1})\; f_{spt} = \frac{c}{d \sin\vartheta}.$$

Note the dependency of $f_{spt}$ on θ: at constant distance d of the microphones, the lowest value of $f_{spt}$ is reached when the DOA is ±π/2, and is equal to c/d. Hence, depending on the DOA θ, spatial sampling introduces spatial aliasing for all signal frequencies that are higher than $f_{spt}$.

To explain the impact of spatial aliasing on two-dimensional spectrum resulting from the application of a Fourier transform to the two-dimensional space-time matrix representation of the acoustic signal, and hence on the localization and beam forming algorithm as described above, the relationship that maps the two-dimensional FFT frequency bins to the physical parameters of the system may be considered.

With the following definitions:

M=number of microphones (=number of spatial FFT input samples=columns of matrix $W_{NM}$)

N=number of time FFT input samples (rows of matrix $W_{NM}$)

$F_{SM}$=1/d=spatial sampling frequency along the microphone array axis (corresponding to θ=±π/2).

$F_{sT}$=temporal sampling frequency, the k-th bin of the spatial FFT corresponds to the spatial frequency (in m$^{-1}$)

$$f_M(k) = k\frac{F_{sM}}{M} = \frac{k}{dM}, \quad k = 0 \ldots M-1, \tag{28}$$

and the i-th bin of the temporal FFT corresponds to the temporal frequency (in s$^{-1}$)

$$f_T(i) = i\frac{F_{sT}}{N}, \quad i = 0 \ldots N-1. \tag{29}$$

Following the previous equation (13), $$f_x = f\frac{\sin\vartheta}{c},$$

the spatial frequency bins map into the temporal frequency bins of the two-dimensional FFT matrix $W_{NM}$ as follows:

$$f_M(k) \cong f_T(i)\frac{\sin\vartheta}{c}. \tag{30}$$

The ≅ symbol is used in this context because of the discretization of the frequency values introduced by the DFT.

Substituting the equations (28) and (29) from above yields:

$$k \cong i\frac{d}{c}\frac{M}{N}F_{sT}\cdot\sin\vartheta. \tag{31}$$

From this formula, it can be seen that spatial aliasing happens for all those 2D frequency bins which, for a given set of values of parameters d, c, M, N, $F_{sT}$, and θ, have k values $$< -\frac{M}{2} \text{ or } > \frac{M}{2}$$

for values of i in the range between $$-\frac{N}{2} \text{ and } \frac{N}{2}.$$

In particular, spatial aliasing will happen when $$\frac{c}{d} < F_{sT}\sin\vartheta.$$

For the example of a sinusoidal signal sweeping with frequencies between 0 and $F_{sT}/2$ reaching the array at an angle θ, the location of peaks in the resulting spectrum wraps around the spatial frequency axis, as shown in FIG. 6.

As a consequence, in the presence of potential spatial aliasing, an isolated peak may be associated with at least two different DOAs and, therefore, may lead to ambiguous results. This issue can be solved, however, by considering a repetition of the matrix $W_{NM}$ along the spatial frequency axis, as shown in FIG. 7. The matrix $W_{NM}$ is translated by M spatial frequency samples into the positive and/or negative direction along the spatial frequency axis. The resulting matrix may be considered as an extended frequency matrix $W'_{NM}$ for all further steps of the described embodiment of source localization and beam forming instead of the original frequency matrix $W_{NM}$. In particular, by adopting the extended frequency matrix, most ambiguities related to spatial aliasing can be resolved.

From equation (30), it can also be gleaned that for any given set of values of parameters d, c, M, N, $F_{sT}$, there are combinations of (k, i) where a peak is not supposed to be found because they cannot be reached for any DOA of the source, considering the full range of possible angles θ between –π/2 and π/2.

Starting from the maximum possible angles –π/2 and π/2 for the DOA of any source, a region (shown in grey in FIG. 8) can be determined where peaks can be found, and another region (shown in white in FIG. 8) where they are not expected to be found—again due to the finiteness of the speed of the acoustic wave. The latter region may be called the 'forbidden' region for spectrum peaks. The boundaries of the 'forbidden' region are identified by replacing θ=±π/2 in the equation $f_x$=f sin θ/c.

Peaks in the 'forbidden' region of the spectrum, therefore, indicate 'false positive' detections of a source, since in real systems no peaks may be found in the 'forbidden region'. Such peaks may, however, be present in the described algorithm due to the presence of secondary sound sources that are relatively close to the microphone array and violate the assumption of 'far field' that is at the basis of an embodiment. Examples for a secondary disturbing source include echoes and reverberations generated by surfaces (tables, walls) close to the microphone array. Since detection of such secondary sound sources shall generally be avoided, the search for peaks in the spectrum according to an embodiment may exclude the 'forbidden' region. Avoiding a search for peaks in the spectrum in the 'forbidden' region also has the advantage of reducing the computational requirements of the algorithm.

The above-described determinations and calculations may be performed by a computing circuit such as a software-programmable microprocessor or microcontroller, a firmware-programmable circuit such as a field-programmable gate array (FPGA), or an application-specific circuit such as an application-specific integrated circuit (ASIC). Furthermore, the above-described apparatus may be part of a system, such as a computer system or a smart phone, and at least part of such a system may be implemented as a system on a chip (SOC).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus for localizing an acoustic source, comprising:
    a microphone array including a plurality of microphones to detect the origin of a sound source, the microphone array having a number of spatial dimensions D and the microphone array configured to temporally sample an acoustic signal to form a D+1 dimensional space-time matrix representation of the acoustic signal; and
    a processing unit coupled to the microphone array, the processing unit being configured to apply a D+1 dimensional Fourier transform to the D+1 dimensional space-time matrix representation of the acoustic signal to thereby generate a D+1 dimensional frequency matrix representing the spectrum in the form of the spectral distribution of temporal and spatial frequencies of the temporally sampled acoustic signal in a D+1 dimensional Fourier space,
    to determine a first peak in the spectrum corresponding to the D+1 dimensional frequency matrix,
    to determine a line extending from an origin of the D+1 dimensional Fourier space of the D+1 dimensional space-time matrix through the first peak, wherein the line includes predetermined points,
    to interpolate and/or extrapolate the D+1 dimensional frequency matrix onto the predetermined points to obtain a one-dimensional spectrum including frequency values given by temporal frequency values of the predetermined points, and
    applying a one-dimensional inverse Fourier transform to the one-dimensional spectrum to thereby compute a direction of arrival of the acoustic signal emitted by the source.

2. The apparatus of claim 1 wherein D=1 so the microphone array is a linear microphone array having a single dimension.

3. The apparatus of claim 1 wherein D is equal to or greater than two so the microphone array has multiple dimensions.

4. The apparatus of claim 1 wherein the acoustic signal includes voice signals.

5. The apparatus of claim 1, wherein the processing unit is configured to determine the direction of arrival that the acoustic signal propagates as an angle between a connection line between one of the microphones of the microphone array an acoustic source that generated the acoustic signal and a connection line between extending between microphones of the array along a dimension of the microphone array.

6. The apparatus of claim 1, wherein the processing unit is configured to determine the direction of arrival that the acoustic signal propagates relative to one of the microphones of the microphone array.

7. A system for localizing an acoustic source, comprising:
    an N-dimensional array of antenna elements, to detect the origin of a sound source, configured to receive a signal that propagates from the source;
    a sampler coupled to the array and configured to generate sets of samples of the signal, each set corresponding to a respective one of the antenna elements and each set forming an N+1 dimensional space-time matrix representation of the signal, and wherein the signal is assumed to be a plane wave propagating in a plane including a source of the signal and at least one of the receivers in the array of receivers; and a computing circuit coupled to the sampler and configured to transform the sets of samples corresponding to respective space-time matrix representations of the signal into a transformed frequency domain matrix, and to determine a first peak in a spectrum corresponding to each frequency domain matrix, to determine a line extending from an origin of the D+1 dimensional Fourier space of the D+1 dimensional space-time matrix through the first peak, wherein the line includes predetermined points, to interpolate and/or extrapolate the D+1 dimensional frequency matrix onto the predetermined points to obtain a one-dimensional spectrum including frequency values given by temporal frequency values of the predetermined points, and applying a one-dimensional inverse Fourier transform to the one-dimensional spectrum to thereby calculate the direction of the signal source based on the first peak.

8. The apparatus of claim 7 wherein the computing circuit is configured to execute software instructions.

9. The apparatus of claim 7 wherein at least a portion of the computing circuit is firmware configurable.

10. A method for localizing an acoustic source, comprising:

receiving with an array of a plurality of receivers a first signal that propagates from the source in a first direction, the array having a number of spatial dimensions D;

sampling the first signal at each of the receivers to generate a D+1 dimensional space-time matrix representation of the first signal;

transforming the D+1 dimensional space-time matrix representation of the first, signal through a D+1 dimensional frequency domain transform to generate a D+1 dimensional frequency matrix representing the spectrum in the form of the spectral distribution of temporal and spatial frequencies of the temporally sampled first signal in a D+1 dimensional frequency domain transform space;

determining a first peak in the spectrum corresponding to the D+1 dimensional frequency matrix;

determining a line extending from an origin of the D+1 dimensional frequency domain transform space of the D+1 dimensional space-time matrix through the first peak, wherein the line includes predetermined points;

interpolating or extrapolating, or both interpolating and extrapolating, the D+1 dimensional frequency matrix onto the predetermined points to provide a one-dimensional spectrum including frequency values given by temporal frequency values of the predetermined points; and transforming through a one-dimensional inverse frequency domain transform to the one-dimensional spectrum to thereby compute a direction of arrival of the first signal emitted by the source.

11. The method of claim 10, wherein the first signal is an acoustic signal.

12. The method of claim 10, wherein the frequency domain transform is a Fourier transform.

13. A non-transitory computer-readable medium storing instructions that, when executed by a computing apparatus, cause the computing apparatus, or a circuit under control of the computing apparatus:

to receive a plurality of samples from an array of a plurality of receivers receiving a first signal that propagates from the source in a first direction, the array having a number of spatial dimensions D and the plurality of samples forming a D+1 dimensional space-time matrix representation of the first signal:

to transform the D+1 dimensional space-time matrix representation of the first signal through a D+1 dimensional frequency domain transform to generate a D+1 dimensional frequency matrix, representing the spectrum in the form of the spectral distribution of temporal domain transform space;

to determine a first peak in the spectrum corresponding to the D+1 dimensional frequency matrix;

to determine a line extending from an origin of the D+1 dimensional frequency domain transform space of the D+1 dimensional space-time matrix through the first peak, wherein the line includes predetermined points:

to interpolate and/or extrapolate the D+1 dimensional frequency matrix onto the by temporal frequency values of the predetermined points: and to transform through a one-dimensional inverse frequency domain transform to the one-dimensional spectrum to in this way determine a direction of arrival of the first signal emitted by the source.

* * * * *